July 14, 1959 C. C. DEWITT ET AL 2,894,954
METHOD OF SELECTIVELY EXTRACTING AMINO ACIDS
Filed April 25, 1957
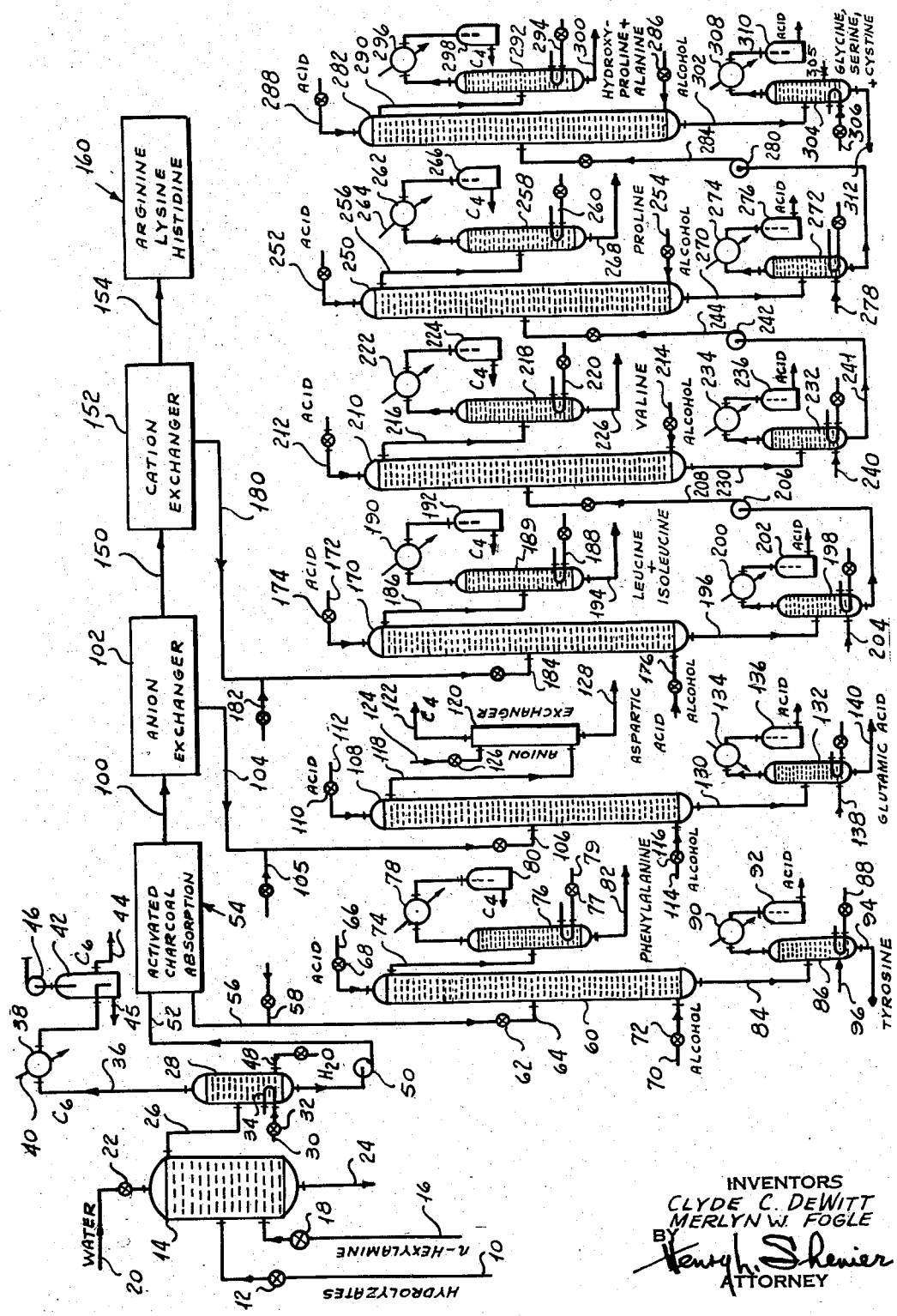
INVENTORS
CLYDE C. DeWITT
MERLYN W. FOGLE
BY Henry L. Shenier
ATTORNEY

United States Patent Office 2,894,954
Patented July 14, 1959

2,894,954

METHOD OF SELECTIVELY EXTRACTING AMINO ACIDS

Clyde C. DeWitt, Lansing, and Merlyn W. Fogle, Midland, Mich., assignors to Eagle Ottawa Leather Company, Grand Haven, Mich., a corporation of Michigan Application April 25, 1957, Serial No. 655,048

10 Claims. (Cl. 260—309)

Our invention relates to a method of selectively extracting amino acids and, more particularly, to a method of extracting amino acids from hides, leather scrap or other proteins.

Amino acids are constituents of proteins and may be defined as organic compounds which contain in their respective chemical structures a carboxyl group and an amino, or imino, group in the alpha position.

Many of the amino acids are essential or indispensable to human nutrition in that the animal system cannot synthesize them either at all, or at a rate commensurate with its needs. Continued absence of indispensable amino acids from a diet leads to loss of appetite, loss of weight, characteristic pathological changes and eventually death. Certain amino acids are not essential in that the animal system can synthesize them. This does not mean that they are valueless in dietary requirements.

Amino acids are present in the hydrolytic product of proteins. Hydrolysis, by which the protein molecule is broken down to its component amino acids, may be practiced in a variety of ways. Proteins may be hydrolyzed by acids such as hydrochloric acid or sulfuric acid. Proteins may be hydrolyzed by alkalies such as sodium hydroxide, potassium hydroxide or barium hydroxide. Then too, proteins may be hydrolyzed by suitable proteolytic enzymes. In each process that is employed for hydrolysis there is a liberation of two amino acids and the gain of one molecule of water on hydrolyzing a peptide linkage.

With the exception of glycine, all naturally occurring amino acids are optically active. Synthetic amino acids are optically inactive, that is, they contain equal quantites of the dextro and leavo forms of optical isomers. Stated otherwise, they are racemized. The L-amino acids are metabolized by the human system. Others do not appear to be.

The process of selectively extracting amino acids is rendered difficult by the tendency in their processing to become racemized and hence less valuable for human nutrition.

Another property of amino acids and one which makes separations difficult is their ability to form "zwitterions." A zwitterion is an ion carrying charges of opposite sign. This intermolecular neutralization of the acid part of the amino acid by the amino or basic group imparts a salt-like character to the amino acids. The salt characteristics will then predominate the physical properties, rendering separations more difficult.

One method of the prior art for the separation of amino acids has been precipitation and crystallization. This method depends for success, first, on the selection of an appropriate protein rich in the desired amino acid, and second, the selection of conditions for crystallization directly after hydrolysis or by the addition of a reagent which will specifically precipitate the desired amino acid. These methods are highly inefficient and costly. Accordingly, many amino acids are difficult to obtain and high in price. A separate precipitation and processing is required for each specific amino acid.

A customary tool of separation of the prior art, namely distillation, is not appropriate for the selective extraction of amino acids. The formation of zwitterions produces the pseudosalts. These exhibit very high melting points and usually decompose before they melt. At atmospheric pressure they become completely decomposed before they boil. Attempts have been made to form ethyl esters of amino acids and distill these. Other investigators have practiced a step of acetylation followed by distillation. These methods have resulted in poor yields of the ester acetates, making the practice of the method impracticable.

Chromatographic methods of separation of amino acids have been tried. Chromatography is a method of fractionation of mixtures of substances. In the operation of a chromatogram a mobile, gaseous or liquid phase is used to wash the substances to be separated through a column of porous material. This procedure results in the distribution of the components of the mixture reversibly between the nonmobile and the mobile phases. The selective forces of sorption upon which the fractionation depends are those utilized in a countercurrent multistage procedure which possesses high resolving power. The name "chromatography" comes from an initial demonstration of the process by Tswett, who poured a petroleum ether extract of green leaves over a column of finely powdered calcium carbonate housed in a vertical glass tube. The pigments and the extract were first adsorbed at the top of the column. As more fresh solvent was percolated through the column, the individual components of the mixture began to migrate down the column as discrete zones, each at its own characteristic rate. Finally, the pigments were separated from one another, producing a dramatic display of colors, which gave rise to the name "chromatography." It appears that chromatographic methods are able to separate amino acids in laboratories, but the yields and expense of the process are such that there is no indication of commercial adaptability of these methods for the large-scale production of amino acids.

Some amino acids are acidic, others are basic and still others are neutral. For example, glutamic acid and aspartic acid are acidic. Arginine, histidine and lysine are basic. The neutral amino acids comprise leucine, isoleucine, glycine, tyrosine, phenylalanine, alanine, cystine, methionine, threonine, serine, valine, proline and hydroxyproline. Ion exchange methods may be employed for the separation of amino acids, first into groups, and also for the isolation of individual amino acids. Ion exchange methods lend themselves more readily in their commercial aspect to the separation of amino acids into groups than they do for the separation of individual acids. Large-size equipment is necessary for the production of relatively small amounts of amino acids. Accordingly, it does not appear that ion exchange methods are commercially suitable for the isolation of individual acids without the tedious one-by-one removal of each acid.

Another method which has been successful in separating amino acids into large groups has been electrophoresis. By this phenomenon, charged particles will migrate through a fluid under the influence of an electric field. Electrophoretic methods, however, are high in cost with respect to the yields produced and are, therefore, not commercially feasible.

Our method depends on liquid-to-liquid extraction. We have found that only continuous countercurrent extraction permits large-scale operation where a great many extraction stages are involved. Where a solute may be distributed between two liquid phases, the ratio of the concentration of the solute in the lighter phase with respect to the concentration of the solute in the heavier phase is usually referred to as the partition coefficient K.

Extractability, E, may be expressed as the product of the partition coefficient and the ratio of the light liquid to the heavy liquid.

In preferential countercurrent extractions, the heavier liquid is allowed to flow countercurrent to the lighter liquid and the feed enters at the center of the column. The introduction of the feed at the center of the column or at an intermediate zone adjacent to the center of the column is an extremely important consideration. The feed, it will be observed, is thus acted upon by two solvents and these must be substantially totally immiscible. A minor amount of solvent enters with the feed.

With preferential countercurrent liquid-to-liquid extraction, the components in the mixture being subjected to extraction will dissolve preferentially in one or the other of the two solvents. In carrying out our process, we perform the liquid-to-liquid extraction in a plurality of liquid-to-liquid contact zones in any appropriate apparatus. One form of apparatus suitable for carrying out our invention is that shown in United States patent to Othmer 2,000,606, dated May 7, 1935. Another form of apparatus capable of carrying out our invention is that shown in United States patent to Robinson 2,072,382, dated March 2, 1937. Similarly, a Scheibel column may be employed, such as shown in United States Patent 2,493,265, dated January 3, 1950. As will be pointed out more fully hereinafter, one of the two solvents employed is an acid having corrosive effects on metal. The apparatus, therefore, should preferably be made of, or lined with, acid-resistant material such as tantalum, tetrafluoroethylene polymer, or the like.

We have discovered that we may carry on a process of selective extraction of amino acids by preferential countercurrent extraction in a plurality of contacting zones.

One object of our invention is to provide a process of separating amino acids as a group from protein hydrolyzates.

Another object of our invention is to provide a process of selectively separating amino acids by continuous countercurrent, preferential, liquid-to-liquid extraction.

Another object of our invention is to provide a method of selectively extracting amino acids from hides, leather scrap, or other proteins in economically advantageous amounts.

Other and further objects of our invention will appear from the following description.

The accompanying drawing, which forms part of the instant specification and is to be read in conjunction therewith, is a schematic view showing one form of apparatus capable of carrying out the process of our invention.

In general, our invention contemplates hydrolyzing proteins from any appropriate source, which may be scrap or waste material, into a plurality of amino acids. Collagen, for example, like other proteins, may be hydrolyzed into seventeen or more amino acids, thirteen of which are present in amounts of 13% to 23% of the collagen. The amino acids are then extracted as a group by countercurrent liquid-to-liquid extraction by n-hexylamine and water. The hexylamine is removed by steam distillation and the entire group of amino acids is passed over activated charcoal. The aromatic amino acids are absorbed. These are tyrosine and phenylalanine. They are separated from each other, as will be pointed out more fully hereinafter, by means of the process of our invention involving countercurrent, preferential, liquid-to-liquid extraction. The remaining amino acids which comprise the acidic, neutral and basic nonaromatic amino acids are then passed through an anion exchanger. The acidic amino acids, namely aspartic acid and glutamic acid, are separated as a group. They are separated from each other by means of the process of our invention, namely, preferential, liquid-liquid extraction.

The balance of the amino acids comprise neutral amino acids and basic amino acids. The basic amino acids are separated from the neutral acids in a cation exchanger. The basic amino acids comprising arginine, histidine and lysine are separated as a group. The neutral acids are successively extracted in a plurality of successive liquid-to-liquid extraction zones, whereby we are enabled selectively to extract desired amino acids.

More particularly, referring now to the drawing, protein hydrolyzates from any appropriate source are passed through pipe 10 under the control of valve 12 into a tower 14. It will be observed that the pipe 10 is introduced into the middle of the column 14. N-hexylamine from any appropriate source is pumped through pipe 16 under the control of valve 18 to the bottom of the column 14. The column 14 is much shorter than needed for the separations of individual amino acids. Water from any appropriate source passes through pipe 20 under the control of valve 22 into the top of column 14. In a column having twenty-one stages the hydrolyzates were fed at the rate of 300 gallons per hour. Water was pumped into the top of the column at the rate of 150 gallons per hour and hexylamine was pumped into the bottom of the tower at the rate of 500 gallons per hour.

Substantially all (in the order of from 90% to 96%) of the amino acids pass to the n-hexylamine solvent. This excellent separation is achieved owing to the fact that the partition coefficients of amino acids between n-hexylamine and water are all about 1.0, or slightly above. Salts, such as sodium sulfate, having such a low partition coefficient they are also removed going to the water phase. It will be observed, therefore, that preferential, liquid-to-liquid extraction of the crude hydrolyzates serves to separate the amino acids as a group and at the same time desalts the amino acid mixture. The water solvent is withdrawn from the tower 14 through pipe 24 and may be discarded as waste. The mixture of amino acids dissolved in n-hexylamine is withdrawn from the tower 14 through pipe 26 and is passed to a stripping tower 28, from which the n-hexylamine is distilled off through heat supplied by steam introduced through pipe 30 under the control of valve 32 for passage through a coil 34. The n-hexylamine vapors pass overhead through pipe 36 and are condensed in condenser 38 by heat exchange with a cooling medium passed through pipe 40. The liquid n-hexylamine is collected in separator 42, from which it is withdrawn through pipe 44 for recycling to tower 14. If desired, the distillation system may be maintained under subatmospheric pressure by means of a vacuum pump 46. Water condensate is withdrawn from the separator through pipe 45.

The amino acids are water-soluble and they are continuously stripped from the bottom of still 28 by water introduced into the still through pipe 48 and pumped by pump 50 through pipe 52 to an activated charcoal absorption system, indicated generally by the reference numeral 54. The absorption of aromatic amino acids by activated charcoal forms no part of the instant invention. This is disclosed by Schramm and Primosigh, Z. physiol. Chem. 282, 271 (1947), and by Tiselius, Drake and Hagdahl in Experimentia 3, 21 (1947).

In the separation zone 54 tyrosine and phenylalanine, the two aromatic amino acids, will be separated from the remaining amino acids and will be withdrawn from the activated charcoal absorption step through pipe 56 into which water may be introduced through pipe 58 to serve as a carrier of the two aromatic amino acids for introduction into countercurrent extraction tower 60 and to dilute the concentration of acids to below a critical point, as will be pointed out more fully hereinafter.

It should be noted that the successful separation of amino acids, one from the other, by preferential, countercurrent, liquid-liquid extraction depends on the respective partition coefficients of the amino acids involved for the solvent system employed.

As a result of much investigation on our part, we have discovered that excellent results may be obtained with one of the solvents being an aliphatic alcohol of four or five carbon atoms per molecule, selected from the class consisting of normal butyl alcohol, isobutyl alcohol, normal amyl alcohol and isoamyl alcohol. These alcohols are only very slightly soluble in water and, therefore, substantially immiscible therewith. They are all lighter than the acid which is to be used as the heavy solvent and in the solvent system used provide excellent partition coefficients for the amino acids.

We have found that the heavy solvent should be an inorganic acid selected from the class consisting of hydrochloric acid and hydrobromic acid. These acids, with the alcohols pointed out above, provide excellent partition coefficients for the amino acids, enabling their selective separation by preferential, countercurrent, liquid-liquid extraction. For some reason unknown to us, sulfuric acid, acetic acid and the like do not provide satisfactory partition coefficients for the amino acids.

By way of example and not by way of limitation, the following table shows partition coefficients for respective of fifteen separate amino acids with several solvent systems:

*Partition coefficients*

|  | N-butanol vs. 5% HCl | Isobutanol vs. 10% HCl | N-butanol vs. 10% HCl |
| --- | --- | --- | --- |
| Leucine | 1.080 | 1.120 | 1.130 |
| Isoleucine | 0.910 | 0.990 | 1.040 |
| Phenylalanine | 1.080 | 1.070 | 1.500 |
| Tyrosine | 6.670 | 0.760 | 1.020 |
| Valine | 0.410 | 0.470 | 0.660 |
| Aspartic Acid | 0.240 | 0.130 | 0.250 |
| Proline | 0.210 | 0.170 | 0.290 |
| Glutamic Acid | 0.100 | 0.170 | 0.300 |
| Hydroxyproline | 0.120 | 0.160 | 0.250 |
| Alanine | 0.120 | 9.140 | 0.320 |
| Serine | 0.079 | 0.090 | 0.130 |
| Glycine | 0.040 | 0.067 | 0.110 |
| Lysine | 0.035 | 0.047 | 9.070 |
| Arginine | 0.048 | 0.043 | 0.100 |
| Histidine | 0.029 | 0.040 | 0.140 |

We have found that the presence of other amino acids does not affect the partition coefficient of any one amino acid. We have also discovered that temperature has a negligible effect on partition coefficients. As will be observed by reference to the above table, the acid strength has a marked effect on partition coefficients. Its strength, therefore, for a particular operation must be carefully controlled. The acid strength, furthermore, must not be in excess of 14.8% in a system in which butanol is employed. If it exceeds this concentration, the interface between the acid and the alcohol will disappear. It will be observed, therefore, that an acid strength below that which destroys the interface must be employed.

Partition coefficients, furthermore, may be increased somewhat by adding inorganic salts not in excess of 15% of the water present to the acid solvent. This mechanism is well understood in the art as the solubility of a solvent can be reduced by the use of a dissolved salt. As pointed out above, water is added to the amino acid mixture to reduce the concentration of amino acids in the feed. We have found that the feed must contain less than about 20% of the amino acids. If the concentration exceeds about 20%, there will be solubilization and disappearance of phases which will prevent our process from operating.

We have also found that for high recoveries and where there are small quantities of a desired amino acid present, a large number of contacting stages are required. In practice, a column having forty stages is satisfactory for excellent extractions.

It is to be remembered that simple countercurrent extractions, even with our solvent systems, will not produce our results. A forty-stage column was set up and a mixture of leucine and tyrosine was dissolved in 5% hydrochloric acid. This mixture was fed into the top of a tower, such as a tower 60, having forty stages and butanol was introduced into the bottom of the tower. Twelve gallons of butanol were fed for each ten gallons of the hydrochloric acid-amino acid mixture. The alcohol layer was found to contain 100% of the leucine, but it also contained 80% of the tyrosine. The acid layer contained 20% of the tyrosine. It will be seen from this that simple countercurrent extraction permitted only a limited amount of separation.

Contrasted with simple countercurrent extraction, we now took the same mixture of leucine and tyrosine and fed it to the middle of a forty-stage tower in a 15% water solution. We introduced a 5% solution of hydrochloric acid at the top of the tower at the rate of ten gallons per hour and introduced butanol to the bottom of the tower at the rate of twelve gallons per hour. The alcohol layer contained 99.9% of leucine and the acid layer contained 99.5% of tyrosine. It will be observed that the solvents are substantially mutually exclusive. While 99.9% of leucine was extracted, only .03% of tyrosine was extracted in the alcohol layer. Conversely, while 99.5% of tyrosine was dissolved in the acid, only .01% of leucine was present in the acid solvent. Stated otherwise, when one amino acid is extracted by our method, all other amino acids are not extracted. Because of this phenomenon, a mixture of amino acids may be successively extracted to obtain the amino acid having the highest respective partition coefficient of the mixture dissolved in the alcohol phase.

Referring again to the drawing, the solution of phenylalanine and tyrosine containing less than 20% of the amino acids under the control of valve 62 is introduced into the center of the column 60 through pipe 64. For purposes of convenience, we will refer to the acid component as "acid," though it is to be understood that by this we mean a solution of hydrochloric acid or hydrobromic acid, or mixtures of these, in a strength not exceeding that which would cause loss of the interface between the solvents, and preferably in the order of 5%. Similarly, for convenience, we will refer to the other solvent as "alcohol." By this we mean normal butyl, isobutyl, normal amyl, or isoamyl alcohols, or mixtures of these.

Acid is introduced to the top of the tower through pipe 66 under the control of valve 68 and flows downwardly through the plurality of contacting zones countercurrent to alcohol which rises upwardly through the successive contacting zones after it is introduced into the bottom of the tower through pipe 70 under the control of valve 72.

The partition coefficient of phenylalanine being higher than that of tyrosine, the former will become dissolved in the alcohol solvent and the tyrosine will be substantially dissolved in the acid layer. The alcohol containing its dissolved amino acid is removed from the top of the tower through pipe 74 and introduced to a still 76, from which the alcohol is stripped from the phenylalanine by means of heat, such as steam, introduced through pipe 79 under the control of valve 77. The alcohol vapors are condensed in condenser 78 and collected in tank 80 for reuse. The phenylalanine is withdrawn from the still through pipe 82 as one of the desired final products. The acid layer containing the dissolved tyrosine is removed from the tower 60 through pipe 84 and passed to a still 86 whence the acid is stripped from the mixture by means of steam introduced through pipe 88 to the heating coil of the still. The acid vapors are condensed in condenser 90 and collected in tank 92. The tyrosine is withdrawn from the still 86 through pipe 94 as one of the desired amino acids. Water may be introduced into the still, if desired, through pipe 96.

It is to be understood that while we have shown the separation of the alcohol and solvent acid from the amino acids by distillation, any appropriate method of separation may be employed. The method shown is given for purposes of illustration only and not by way of limitation. The alcohol, for example, may be continuously recovered by passing it through an ion exchange resin column. An appropriate resin in the form of a sodium salt containing active carboxylic acid groups is suitable for separating the alcohol from the amino acid. Again, alcohol may be separated from the amino acid-alcohol solution by a sulfonic acid type of resin. Any appropriate ion exchange resin may be employed. Similarly, the acid solvent may be separated from the amino acid by an appropriate ion exchange resin. Since these ion exchange separation methods are known to the art and form no part of our invention, they are not described in detail. It is to be understood, however, that all separation methods known to the art are to be considered equivalents.

The nonaromatic amino acids leave zone 54 through pipe 100 and pass through an anion exchanger 102 which serves to separate the acidic amino acids from the basic and neutral amino acids. An appropriate anion exchanger is disclosed in the patent to E. J. Roberts, numbered 2,590,209, and dated March 25, 1952. The acidic amino acids are withdrawn from the anion exchange zone through pipe 104 and are diluted with water through pipe 105 to a sufficiently dilute solution. This solution is then introduced through pipe 106 into tower 108. Acid under the control of valve 110 is introduced through pipe 112 to the top of the tower. Alcohol from pipe 114 under the control of valve 116 is introduced to the bottom of tower 108. It is understood, of course, that the proper ratio flow of one solvent to the other must be maintained if full efficiency of the column is to be realized. The solvent ratio may be determined by the following equation:

$$\text{Solvent Ratio} = \frac{\text{Alcohol}}{\text{Acid}} = \sqrt{\frac{1}{K_1 K_2}}$$

where $K_1$ is the highest partition coefficient of the amino acid in the mixture, and $K_2$ is the next highest partition coefficient of the amino acid in the mixture.

The alcohol phase containing aspartic acid as a solute leaves the tower 108 through pipe 118 and is passed into an anion exchanger 120, upon which the acidic aspartic acid will be deposited. The alcohol is removed through pipe 122 for reuse. The aspartic acid may be leeched from the resin by a solvent introduced into the column through pipe 124 under the control of valve 126. The aspartic acid in solution is removed from the anion exchanger 120 through pipe 128.

The glutamic acid in solution in the solvent acid is withdrawn from the tower 108 through pipe 130 and introduced into still 132. The solvent acid is distilled from the solution, condensed in condenser 134 and collected in tank 136 for reuse. Water may be introduced into the still through pipe 138 to flush the glutamic acid from the still bottom so that it may be removed in solution through pipe 140.

The balance of the amino acids removed from the anion exchanger 102 through pipe 150 will contain neutral amino acids and basic amino acids. The basic amino acids comprise arginine, lysine and histidine. These are precipitated in the cation exchanger 152 and removed through pipe 154 and passed to a recovery zone indicated generally by the reference numeral 160. In the recovery zone 160 the three basic acids may be separated from one another advantageously by "classical" methods. The arginine, for example, may be precipitated by flavianic acid, leaving lysine with histidine. Arginine likewise can be precipitated with benzaldehyde. In the remaining solution lysine may be purified by crystallization as the picrate leaving the residue histidine.

The mixture of neutral amino acids comprises leucine, isoleucine, valine, proline, glycine, serine, cystine, hydroxyproline and alanine. If desired, leucine and isoleucine may be separated from each other by the method of our invention. As a practical matter, however, we prefer to separate leucine and isoleucine as a group from the remaining amino acids. It will be observed, for example, that by using a higher concentration of hydrochloric acid, the partition coefficients of leucine and isoleucine are comparatively close as compared with valine and the remaining neutral amino acids. Accordingly, we may introduce a stronger acid into tower 170 through pipe 172 under the control of valve 174 for passage downwardly countercurrent to a rising alcohol introduced to the bottom of the tower through pipe 176. Into these countercurrent streams of solvents in tower 170 we introduce the mixture of neutral amino acids. This mixture is removed from the cation exchanger through pipe 180, diluted by means of water introduced through pipe 182, and then introduced into the center of the tower through pipe 184. The conditions are such that leucine and isoleucine will pass to the alcohol phase. The alcohol and its solute are removed from the tower 170 through pipe 186 and introduced into a still 189, from which the alcohol is distilled off overhead by means of heat from steam through pipe 188. The alcohol vapors are condensed in condenser 190 and collected in tank 192 for reuse. The leucine and isoleucine in solution are withdrawn from the still 189 through pipe 194. The acid phase carries the rest of the neutral amino acids. These are removed from the tower 170 through pipe 196 and passed to the still 198 from which the acid is distilled off, condensed in condenser 200 and collected in tank 202 for reuse. Water may be introduced into the bottom of the still 198 through pipe 204 to bring the remaining amino acids into a proper solution, which solution is then pumped by pump 206 through pipe 208 into the center of tower 210. Again, acid introduced through pipe 212 is introduced into the tower for downward flow while alcohol is introduced into the bottom of the tower through pipe 214 for upward flow. Valine will now have the highest partition coefficient in the remaining group of amino acids and it will pass to the alcohol phase. Thus it will be removed in alcohol solution through pipe 216 and passed to the still 218. Heat from steam introduced through pipe 220 will evaporate the alcohol. The alcohol vapors are condensed in condenser 222 and collected in tank 224. The valine is withdrawn from the bottom of the still 218 through pipe 226 as one of the desired end products. Of the remaining amino acids extractable with a 5% solution of hydrochloric acid, proline has the highest partition coefficient. The remaining amino acids, as a mixture, are withdrawn from the bottom of the tower 210 in acid solution through pipe 230 and passed to a still 232 in which the acid is distilled off, condensed in condenser 234 and collected in tank 236 for reuse. The remaining mixture of amino acids is diluted by addition of water through pipe 240 and the solution withdrawn from the still 232 through pipe 241 and pumped by pump 242 through pipe 244 for introduction into the tower 250. A 5% solution of hydrochloric acid, or other appropriate acid, is introduced to the top of the tower 250 through pipe 252 as the heavy component. The alcohol is introduced to the bottom of the tower through pipe 254 as the light component for the next preferential, countercurrent, liquid-to-liquid extraction step. The proline in alcohol solution is withdrawn from the top of the tower through pipe 256 and passed to a still 258 whence the alcohol is distilled off by heat supplied from steam through pipe 260. The alcohol vapors are condensed in condenser 262 by cooling water passed through pipe 264 and collected in tank 266 for reuse. The proline is removed in water solution from the bottom of the still 258 through pipe 268 as one of the desired end products. The remaining mixture of amino acids in acid solution is withdrawn from the bottom of tower 250 through pipe 270 and introduced into a still 272, whence the acid is distilled off in the form of an aqueous solution, condensed in condenser 274 and collected in tank 276 for reuse. The remaining acids are brought into correct solution by water introduced through pipe 278. The solution is pumped by pump 280 into countercurrent contacting tower 282 through pipe 284. The partition coefficients of hydroxyproline and alanine are so close that these come off together in the alcohol phase. Alcohol is introduced to the bottom of tower 282 through pipe 286 to passage upwardly through the tower and acid is introduced into the top of the tower through pipe 288 for movement downwardly through the successive contacting zones. Hydroxyproline and alanine, as a solute in the alcohol solvent, are removed through pipe 290 and passed into a still 292 where alcohol is distilled off by heat supplied from steam introduced through pipe 294. The alcohol vapors are condensed in condenser 296 and collected in tank 298 for reuse. The mixture of hydroxyproline and alanine is removed through pipe 300. The alanine is separated from the hydroxyproline by reacting it with benzaldehyde. The remaining amino acids in acid solution are withdrawn from the bottom of the tower 282 through pipe 302 and passed into a still 304 in which the acid is distilled off through heat obtained from steam introduced through pipe 306 to the heating coil in the bottom of the still. The acid and water vapors are condensed in condenser 308 and the condensate collected in tank 310. A mixture of glycine, serine and cystine is removed from the bottom of the still 304 through the pipe 312. If desired, water may be introduced through pipe 305. The cystine may readily be crystallized out of the solution. There may be other solvents which will enable the separation of this group of amino acids by liquid-liquid extraction. The difference in their partition coefficients with an acid-alcohol system is such that this cannot now be done.

It will be seen that we have accomplished the objects of our invention. We have provided a process of separating amino acids as a group from protein hydrolyzates. Our method provides a process for selectively separating amino acids, one from the other, by continuous, contercurrent, preferential, liquid-to-liquid extraction. By our method we may selectively extract amino acids from hydrolyzates from hide scraps, leather scraps and other waste proteins in economically advantageous amounts.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of separating a mixture of amino acids as a group from an impure solution of amino acids containing other substances in solution, including the steps of passing water downwardly countercurrent to n-hexylamine in a plurality of liquid-liquid contacting zones, introducing the impure solution into an intermediate zone, removing the group of desired amino acids as a solute in the n-hexylamine from adjacent an upper zone, and separating the n-hexylamine from the group of amino acids.

2. A method of separating an amino acid from a solution of a plurality of amino acids, including the steps of flowing an aqueous solution of a solvent acid in a strength less than 15% selected from the class consisting of hydrochloric acid and hydrobromic acid downwardly countercurrent to an alcohol selected from the class consisting of normal butyl alcohol, isobutyl alcohol, normal amyl alcohol and isoamyl alcohol in a plurality of liquid-to-liquid contacting zones, introducing an aqueous solution of a plurality of amino acids containing less than about 20% of such acids into an intermediate zone, removing an alcohol solution of a desired amino acid from adjacent an upper contacting zone, separating the alcohol from the desired amino acid solute, removing a remaining amino acid from adjacent a bottom of a liquid-to-liquid contacting zone, separating the solvent acid from its solute and removing the desired amino acid from said separating step.

3. A method of selectively extracting amino acids, including the steps of flowing an aqueous solution of hydrochloric acid in a strength less than 15% downwardly countercurrent to an aliphatic alcohol selected from the class consisting of normal butyl alcohol, isobutyl alcohol, normal amyl alcohol and isoamyl alcohol in a plurality of liquid-liquid contacting zones, introducing a solution of amino acids containing less than about 20% of such acids into an intermediate contacting zone, withdrawing an amino acid having the higher partition coefficient from adjacent an upper zone in solution in said alcohol, withdrawing another amino acid having a lower partition coefficient from adjacent a lower contacting zone in solution in the acid, separating the alcohol from said amino acid having the higher partition coefficient and separating the hydrochloric acid from the amino acid having the lower partition coefficient.

4. A method as in claim 3 in which said alcohol separation step comprises distilling the alcohol from the alcohol solution.

5. A method as in claim 3 in which said alcohol separation step includes passing the alcohol-amino acid solution in contact with an ion exchange resin.

6. A method as in claim 3 in which said acid separation step includes distilling the hydrochloric acid from the acid solution.

7. A method as in claim 3 in which the hydrochloric acid separation step includes passing the acid solution in contact with an ion exchange resin.

8. A method as in claim 3 in which the number of liquid-to-liquid contacting zones is at least forty.

9. A method as in claim 3 in which the amino acid feed solution contains an added inorganic salt whereby to increase the partition coefficients of the amino acids.

10. A method of separating a mixture of amino acids as a group from an impure solution of amino acids, including the steps of passing water downwardly countercurrent to n-hexylamine in a plurality of liquid-liquid contacting zones, introducing the impure solution into an intermediate zone, removing the group of desired amino acids as a solute in the n-hexylamine from adjacent an upper zone and distilling the n-hexylamine from the group of amino acids.

References Cited in the file of this patent

UNITED STATES PATENTS 2,471,053    Almquist et al. _____ May 24, 1949

OTHER REFERENCES

Cornish et al.: Industrial Eng. Chem., vol. 26, No. 4, January-June 1934, pp. 397–405.

Hunter et al.: Industrial and Eng. Chem., vol. 27, No. 7, July-December 1935, pp. 834–845.